Patented Sept. 13, 1938

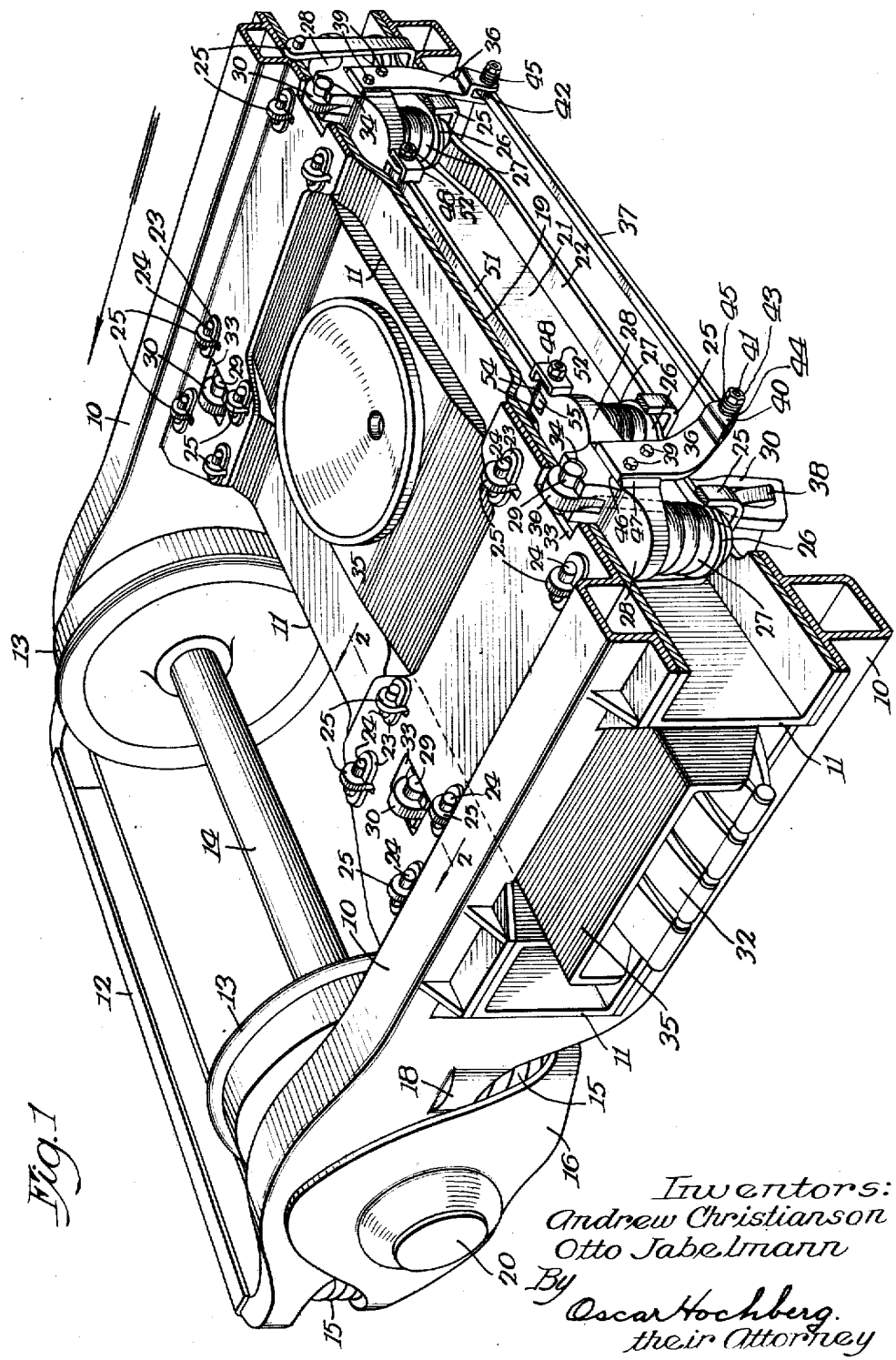

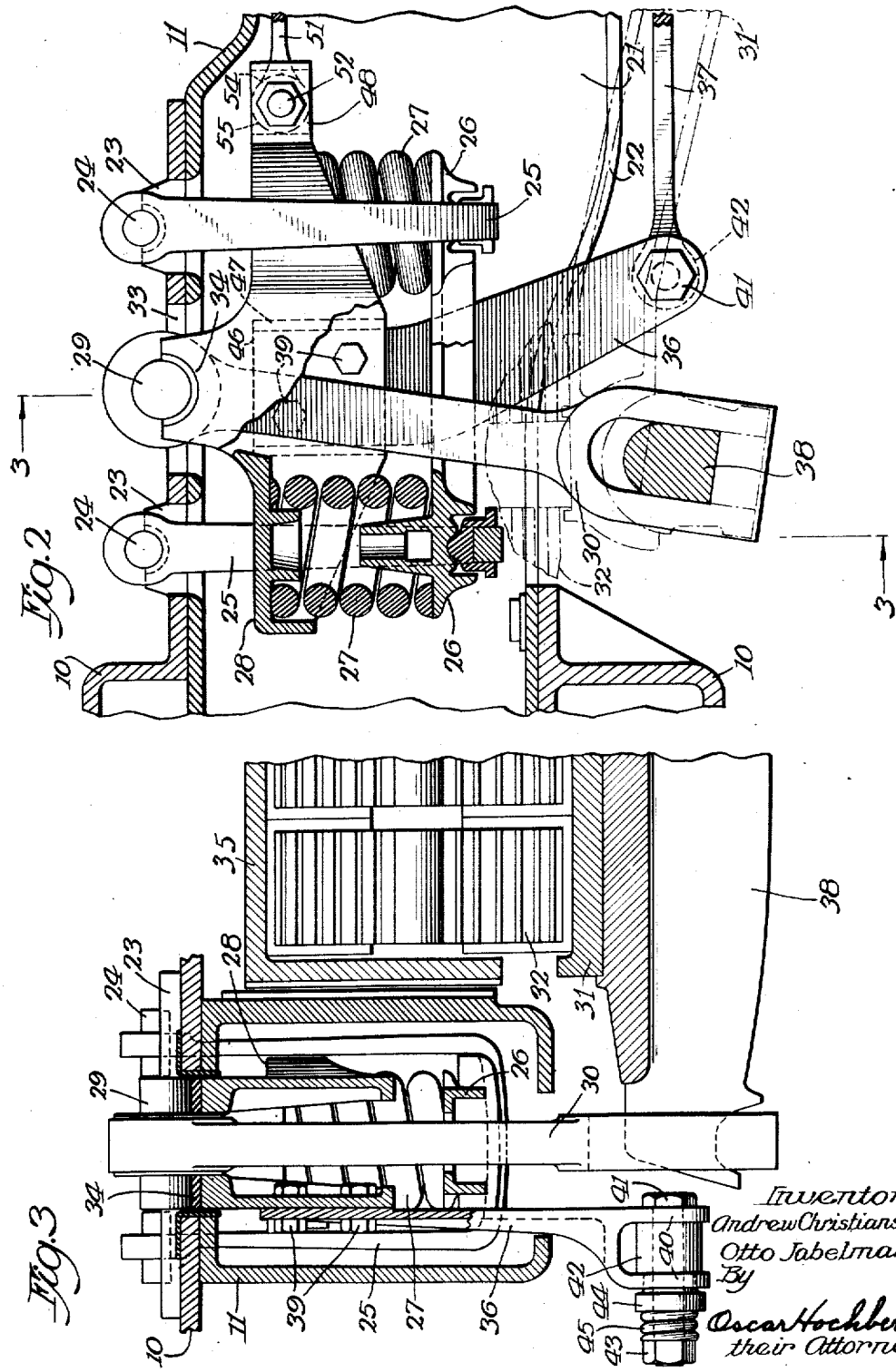

2,129,911

UNITED STATES PATENT OFFICE 2,129,911

CAR TRUCK

Andrew Christianson, Hammond, Ind., and Otto Jabelmann, Omaha, Nebr.

Application March 13, 1937, Serial No. 130,662

7 Claims. (Cl. 105—190)

The invention relates to car trucks generally and has particular reference to the truck frame and bolster suspension mechanism.

The principal object of the invention is to provide triple spring suspension means designed to eliminate synchronization of the springs and thereby to insure stability of operation of the truck and prevent transmission of vibration resulting from rail and wheel impacts.

An important object is to provide triple suspension means involving springs having frequencies of different values so that vibrations set up by abrupt changes in the direction and magnitude of the loads applied at the several springs will not be synchronized.

A particular object of the invention is to provide cushioning and stabilizing means for the bolster swing hangers intermediate the bolster elliptic springs and the springs at the journal boxes, the intermediate cushioning means being supported by auxiliary swing hangers suspended vertically from the truck frame.

The specific object of this invention is to provide a car truck having triple spring suspension means to eliminate synchronization of the springs and insure stability of operation of the truck of the type utilizing separate and independent auxiliary spring groups and to connect complemental groups in such manner as to insure stability of the individual groups.

The foregoing and other objects are attained by the mechanism illustrated in the accompanying drawings, in which—

Fig. 1 is a general perspective view of a car truck embodying the invention;

Fig. 2 is a cross-sectional view through the center of an auxiliary spring group taken on the line 2—2 of Fig. 1 and showing the spring group in detail with portions broken away and illustrating the application of the spring group connecting means; and Fig. 3 is a sectional view also through the center of a spring group but taken longitudinally of the truck on the line 3—3 of Fig. 2 and showing the connection between spring groups in end elevation.

The invention is carried out by mounting the truck frame wheel pieces 10 upon coil springs 15 of a given deflection value supported upon the journal boxes 20 so that the load reactions thence would flow to auxiliary swing hangers 25, suspended vertically and in parallel from the truck frame transoms 11, to spring seats 26 through intermediate springs 27 of relatively high frequency value, thence to separate and independent cap beam members 28 bearing pivots 29 at each transom 11 for supporting separate bolster swing hangers 30, to spring plank 31 through elliptic springs 32 having a relatively low frequency value, thence to the bolster 35. By the provision of springs of different frequencies, the vibrations set up at the wheel are offset by those at the other positions and caused to be overlapped, thereby to prevent the building-up of the combined recoil values of the several springs. By the use of relatively high frequency springs intermediate those at the journal box and the bolster elliptic springs, the bolster swing hanger supporting pivots 29 remain substantially quiescent and undisturbed by the relatively greater movements of the bolster and truck frame with respect to the rail whereby the reactions to truck movement over high spots and depressions in the track will not be communicated to the car body.

As outlined in the drawings, the invention is adapted to an outboard type of truck frame. The drawings depict the outboard framing members 10 between which are the connecting transom members 11 and end sills 12 with pairs of wheels 13 on axles 14 positioned between said transoms and respective end sills as in customary practice. In the embodiment shown, the main supporting springs 15 are supported upon seats 16 on journal boxes 20 in planes substantially below the center line of the axles 14 to minimize the tendency of the springs to upset under braking or starting thrusts or laterally when rounding curves.

The frames are formed with spring caps 18 designed to receive and hold in place the springs 15 upon opposite sides of the journal boxes 20, although the supporting springs 15 may be mounted on top of the boxes should that arrangement be desired or when the space beneath the car floor will permit, but the relatively stable disposition of the springs on seats below the axle center, as shown, is preferred.

The connecting transoms 11 are preferably hollow and rigid with the wheel pieces 10 and formed each with top web 19 and side wall members 21 reinforced by flanges 22 along their lower edges spaced apart to admit the auxiliary suspension elements comprising the vertical hanger links 25, the springs 27, the cap beams 28, the spring seats 26, inclined bolster swing hanger arms 30, and the spring group connecting means 37 and 51 hereinafter described. The transoms are provided on their upper sides with bearings 23 for the pivots 24 of hangers 25 and openings 33 to receive bearings 34 on the spring cap beams 28 for the bolster swing hanger pivots 29.

Under thrust of loads tending to shift the bolster 35 from the normal position indicated in the half-section view in Fig. 1, a movement to the left will cause the inclined bolster swing hanger 30 on the side shown to assume a greater angularity with respect to the spring plank 31 to shorten the hanger arm and compress adjacent bolster spring 32 under the increased load imposed, whereby the springs on the opposite side of the truck will be relieved of a part of their load by the lengthening of the bolster hanger arm on that side and resultant lowering of the adjacent end of the spring plank. The force of the thrust applied at the bolster hanger pivot 29 is communicated to its bearing 34 on spring cap beam 28 and transmitted through springs 27 to seat 26 suspended from the truck frame by the parallel hangers 25 arranged normally vertical for purposes hereinafter outlined.

As the hangers 25 move from their normal vertical position under the load imposed by the bolster hanger pivot 29, the springs 27 are compressed as the angularity of the hanger arms 25 increases to oppose movement of such pivot outwardly towards adjacent side frame by a thrust in the opposite direction under the pent-up energy of the compressed auxiliary springs. The force of the thrust upon pivot 29 subsides at a rate corresponding to the increase in the pressure on the springs 27 until the limit of movement has been reached for the pivot, whereupon the stored energy in the springs is released to restore said pivot and hangers 25 to their normal positions of rest. Neutralization of forces and restoration of pivot position are effected without shock by virtue of the initial vertical disposition of all the hangers 25 whereby normal swinging movements are absorbed without appreciably communicating vibrations to the bolster hanger pivots 29 and result from the greater initial arc of movement of the vertically disposed auxiliary hangers at the spring seats 26 than is possible with hangers normally inclined with respect to the seats.

Because of the initial vertical disposition of the hangers 25, the abrupt lift of auxiliary spring seats 26 on one side of the truck and compensating drop of companion seats on the opposite side are avoided, whereby the spring cap beams 28 supporting the bolster assembly are held in position to become immediately effective yieldably to restrain lateral displacement of bolster hanger pivots 29 and independently of the direction of bolster movement laterally of the truck. With the auxiliary hangers 25 at one side disposed in parallelism with similar hangers at the opposite side, the spring seats 26 will both of them move in planes parallel to a horizontal plane through pivots 24 of these hangers to maintain, through auxiliary springs 27, the spring connecting beams 28 substantially stable, and through said beams the pivots 29 of bolster swing hangers on opposite sides of the truck are held fixed with respect to each other, as hereinafter described, to permit the described movement of the bolster when suspended by hangers 30 inclined as indicated.

The spring cap beams 28 are connected by separate members 51 extending between and pivotally secured to the auxiliary springs 27 on opposite sides of the truck within the respective transoms 11 upon opposite sides of the bolster 35. The connecting bars 51 are joined at their ends to the separate spring caps 28 and connection effected by means of headed bolts 52 passing through jaws 54 on the spring caps and enlargements 55 in the bars 51. A resilient connection 48 prevents chattering and compensates for wear between the joint elements. The spring caps, thus connected, function to prevent nosing of the caps outwardly under the influence of the weight of the bolster assembly carried by the inclined bolster swing hangers 30 which, because of such inclination, tend to shift the pivots 29, with their bearings 34, towards a plane passing through the point of application of the load at the respective swing hanger crossbars 38 held apart by the spring plank 31.

Due to the lateral force of the bolster 35, the cap beams 28 ordinarily are rendered unstable since the horizontal component of the force of the main swing hangers 30 acting in an outwardly transverse direction tend to cant the beams 28 from their normal horizontal plane, and there is nothing to counteract this horizontal force other than the resistance offered by the overloaded outer coil springs 27 until equilibrium has been restored. The primary purpose of this invention is further to stabilize the spring cap beams 28 against sudden forces producing a change in direction of movement or position of the cap members and the overloading of one spring 27 relatively to its companion under thrust of the bolster 35, all of which create tendencies toward canting and undesirable angularities of the cap members 28 and consequent derangement of the desired relation between the parts. That this result might be avoided, the cap beams 28 are provided with downwardly depending extensions 36, cooperating pairs of which are connected at their lowermost extremities by bars 37 extending transversely of the truck beneath the respective transoms 11 at opposite sides of the bolster 35. The members 36, as shown, are interlocked with the cap beams at 46 by means of shoulders 47 and secured by bolts 39, but, obviously, they may be made integral therewith if desired. They are preferably provided at their lower ends with spaced jaws 40 between which the connecting bars 37 are pivotally received and secured by headed bolts 41 passing through the enlarged ends 42 of the bars and held by nuts 43. To prevent vibration and insure quiet in the connection, a collar member 44 is mounted upon the bolt 41 penetrating the one jaw 40 to bear against the enlarged end 42 of the connecting bar 37, as best shown in Fig. 3; and at its opposite side the collar 44 provides a seat for a spring 45 against which the nut 43 bears to exert pressure through the spring 45 upon the collar 44 snugly to press the head 42 against the opposing jaw 40 against the rear face of which the head of the bolt bears placing the bolt 41 in tension and thereby preventing chattering of the parts. The lower connections 37, in combination with the upper connections 51, resist any tendency of the cap beam members 28 to assume any position deviating from their normal horizontal one in the assembly while permitting their free and independent action in absorbing individual shocks, and serve to prevent the cap members from canting from their normally level position under thrust of the bolster 35 transmitted through the hangers 30 as the truck frame is deflected laterally by rail conditions with consequent overloading of one of the springs 27 of the individual groups and further, at all times, keep the cap members 28 of cooperating pairs in parallel relation.

It will be noted that the spring cap beam members 28 on one end of the bolster 35 are mounted separately and independently of the spring cap beam members 28 on the opposite end of the bolster, and the movements of one member are not communicated to the other since there is no direct connection between them. The bolster swing hangers 30, supported from the cap beam members 28, move with their respective members and in response to the loads imposed on such members. The hangers 30 are connected by separate crossbars 38 bridging the space between them to serve at once as supports for the spring plank 31 extending between and holding inclined the bolster swing hangers, as indicated in Fig. 2, and as equalizers for breaking up the longitudinal rocking of the truck frame to prevent transmission of such movement to the spring plank whereby the bolster is held from tilting about its axis during train movement.

As the result of the use of said crossbars 38 as equalizers, a high spot in the rail striking the forward wheel of the truck moving in the direction indicated by the arrow in Fig. 1, would cause that end of the truck to rise an amount determined by the force of impact. Such movement would cause a proportional rise in the adjacent transom supporting the auxiliary suspension springs 27, but, owing to the inertia of the bolster, the springs 27 will yield to permit the bolster swing hanger pivots 29 at that side of the bolster to drop relatively to said transom to compensate for the rise of the truck frame 10 whereby the crossbars 38 will be leveled-out to preserve the bolster equilibrium. Obviously, a movement of the truck in the opposite direction would give rise to a similar sequence of operations in the members on the opposite side of the bolster to effect the same result.

The auxiliary spring beam hangers are each pair of them on one side of the truck parallel to companion pairs of hangers on the opposite side of the truck, so that in operation, when the auxiliary spring seats supported by hangers hung vertically at respectively opposite sides of the truck are shifted transversely by thrust of a load applied at either seat, the seats will be lifted simultaneously and in a common horizontal plane to prevent canting of the respective spring groups, the pressures to be absorbed by the several springs of each group will be more equably distributed, and forces tending to upset the springs are minimized or eliminated.

Auxiliary spring seats 26 on one side of the truck may also be connected, for simultaneous operation, to the seats on the opposite side of the truck by bar members secured at their ends to the respective seats, if desired. The advantages inherent in this invention are available for use in trucks having three pairs of wheels, or more, involving one or more additional bolster assemblies as required.

What is claimed is:—

1. A car truck including journal boxes, springs supported from said boxes, a truck frame supported on said springs, a bolster mounted for movement within said frame, spring beams hung from said frame upon opposite sides of the bolster for independent movement at each side of the truck, pivotal connections between said beams transversely of the truck at opposite sides of the bolster maintaining parallelism between companion beams at each side of the bolster, bolster hangers pivotally suspended from said beams, equalizing bars connecting said hangers, a spring plank supported upon said equalizing bars, and elliptic springs between said bolster and spring plank.

2. A car truck including journal boxes, springs carried by said boxes, a truck frame supported on said springs and comprising side frames and a pair of connecting transom members spaced apart, a bolster mounted for movement between said transoms and side frames, spring beams hung from said transoms for operation independently at each side of the truck and upon opposite sides of the bolster, upper and lower transversely extending connections pivotally secured to said beams at opposite sides of the bolster, separate bolster hangers pivotally supported from said beams, equalizing bars connecting said hangers, a spring plank supported upon said bars, and springs on said plank for supporting said bolster.

3. In a car truck having journal boxes and including a truck frame, springs on the boxes supporting the truck frame, a bolster mounted for movement in the truck frame, coil spring groups hung from the frame intermediate the box springs and bolster and adapted for independent operation upon opposite sides of the bolster, pivotal connections extending transversely between respective spring groups at each side of the bolster, elliptic springs between said intermediate springs and the bolster for supporting the bolster, separate bolster hangers pivotally mounted on said intermediate springs, equalizing bars connecting said hangers, and a spring plank supported upon said bars supporting said elliptic springs.

4. A car truck including journal boxes, springs of a given deflection value on the boxes, a truck frame supported upon said springs, separate springs of relatively high frequency value hung from said frame intermediate said first-mentioned springs at each side of the truck, a bolster mounted for movement between said intermediate springs, pivotal means connecting said intermediate springs at opposite sides of the bolster, equalizing bars connecting said intermediate springs, a spring plank supported upon said bars, and bolster supporting springs of relatively low frequency value on said plank.

5. In a car truck having journal boxes and including a truck frame having transoms spaced apart, springs supporting said frame from the boxes, a bolster mounted for movement between said transoms, companion spring beam assemblies hung from said transoms for independent movement at each side of the truck and upon opposite sides of the bolster and comprising each a spring seat pivotally hung from the respective transoms, springs spaced apart on said seat, a cap beam supported upon said springs, vertically spaced bars extending transversely of the truck for pivotally connecting said springs, parallel hangers suspended vertically from the transoms and pivotally secured to the spring seats adjacent said springs, a relatively inclined bolster hanger supported from each of said cap beams and disposed between the beam hangers, equalizing bars connecting the bolster hangers at adjacent assemblies, a spring plank mounted upon said bars, and springs on said plank for supporting the bolster.

6. A car truck including journal boxes, springs on said boxes, a truck frame supported on said springs and having side frames and connecting transoms spaced apart, a bolster movably supported between said transoms, companion spring beam assemblies hung from said transoms for independent movement upon opposite sides of the bolster and comprising each spring seats disposed at opposite sides of the truck, springs on said seats, a cap beam supported on said springs, hangers suspended vertically from the transoms and pivotally secured to the spring seats adjacent said springs, a relatively inclined bolster hanger supported from each of said cap beams, equalizing bars connecting the bolster hangers at adjacent assemblies, a spring plank supported upon said bars, springs on said plank for supporting the bolster, and means connecting the cap beams of companion spring assemblies for simultaneous operation comprising transversely extending spaced members for maintaining said cap beams in parallel relation.

7. A car truck including journal boxes, springs carried by said boxes, a truck frame supported on said springs and comprising side frames and a pair of connecting transom members spaced apart, a bolster mounted for movement between said transoms and side frames, spring beams hung from said transoms for operation independently at each side of the truck and upon opposite sides of the bolster, transversely extending connections pivotally secured to said beams at opposite sides of the bolster, one of said connections being vertically spaced from the plane of said spring beams, separate bolster hangers pivotally supported from said beams, equalizing bars connecting said hangers, a spring plank supported upon said bars, and springs on said plank for supporting said bolster.

ANDREW CHRISTIANSON.
OTTO JABELMANN.

CERTIFICATE OF CORRECTION.

Patent No. 2,129,911. September 13, 1938.

ANDREW CHRISTIANSON, ET AL.

It is hereby certified that error appears in the printed specification of the above numbered patent requiring correction as follows: Page 3, second column, line 65, claim 5, for the word "mounted" read supported; and that the said Letters Patent should be read with this correction therein that the same may conform to the record of the case in the Patent Office.

Signed and sealed this 13th day of December, A. D. 1938.

Henry Van Arsdale (Seal) Acting Commissioner of Patents.

said seats, a cap beam supported on said springs, hangers suspended vertically from the transoms and pivotally secured to the spring seats adjacent said springs, a relatively inclined bolster hanger supported from each of said cap beams, equalizing bars connecting the bolster hangers at adjacent assemblies, a spring plank supported upon said bars, springs on said plank for supporting the bolster, and means connecting the cap beams of companion spring assemblies for simultaneous operation comprising transversely extending spaced members for maintaining said cap beams in parallel relation.

7. A car truck including journal boxes, springs carried by said boxes, a truck frame supported on said springs and comprising side frames and a pair of connecting transom members spaced apart, a bolster mounted for movement between said transoms and side frames, spring beams hung from said transoms for operation independently at each side of the truck and upon opposite sides of the bolster, transversely extending connections pivotally secured to said beams at opposite sides of the bolster, one of said connections being vertically spaced from the plane of said spring beams, separate bolster hangers pivotally supported from said beams, equalizing bars connecting said hangers, a spring plank supported upon said bars, and springs on said plank for supporting said bolster.

ANDREW CHRISTIANSON.
OTTO JABELMANN.

CERTIFICATE OF CORRECTION.

Patent No. 2,129,911. September 13, 1938.

ANDREW CHRISTIANSON, ET AL.

It is hereby certified that error appears in the printed specification of the above numbered patent requiring correction as follows: Page 3, second column, line 65, claim 5, for the word "mounted" read supported; and that the said Letters Patent should be read with this correction therein that the same may conform to the record of the case in the Patent Office.

Signed and sealed this 13th day of December, A. D. 1938.

Henry Van Arsdale (Seal)  Acting Commissioner of Patents.